United States Patent
Iizuka et al.

[11] Patent Number: 5,200,850
[45] Date of Patent: Apr. 6, 1993

[54] ANAMORPHIC OPTICAL SYSTEM

[75] Inventors: Takashi Iizuka; Akira Morimoto, both of Tokyo, Japan

[73] Assignee: Asahi Kogaku Kogyo Kabushiki Kaisha, Tokyo, Japan

[21] Appl. No.: 846,803

[22] Filed: Mar. 5, 1992

[30] Foreign Application Priority Data

Mar. 5, 1991 [JP] Japan ............................ 3-123234

[51] Int. Cl.$^5$ .......................................... G02B 26/08
[52] U.S. Cl. .................................. 359/206; 359/207; 359/793; 359/216
[58] Field of Search ............... 359/794, 205, 206, 207, 359/216, 217, 218, 219, 668, 662, 650, 683, 793; 250/566

[56] References Cited

U.S. PATENT DOCUMENTS

| | | | |
|---|---|---|---|
| 3,490,826 | 4/1967 | Kazamaki et al. | |
| 4,557,567 | 12/1985 | Azumi et al. | 359/683 |
| 4,564,269 | 1/1986 | Uehara | 359/650 |
| 4,753,524 | 6/1988 | Sugiyama | 359/794 |
| 4,756,583 | 7/1988 | Morimoto | 359/212 |
| 4,799,747 | 1/1989 | Yamakawa | 359/206 |
| 4,962,984 | 10/1990 | Kung | 359/206 |
| 5,015,079 | 5/1991 | Minefuji | 359/775 |
| 5,064,260 | 11/1991 | Shiraishi | 359/205 |
| 5,084,784 | 1/1992 | Hirano | 359/690 |
| 5,140,146 | 8/1992 | Metlitsky et al. | 250/566 |

FOREIGN PATENT DOCUMENTS 59-34512  2/1984  Japan .

OTHER PUBLICATIONS

English Abstract of Japanese Laid-open Patent Publication No. 59-34512.

*Primary Examiner*—Loha Ben
*Attorney, Agent, or Firm*—Sandler, Greenblum, & Bernstein

[57] ABSTRACT

An anamorphic optical system is provided with an imaging lens group comprising one or more plastic lenses and a single plastic correcting lens disposed on the image plane said of the imaging lens. The focal displacement of the optical system due to temperature changes is kept within the focal depth of the system.

6 Claims, 14 Drawing Sheets

ANAMORPHIC OPTICAL SYSTEM

BACKGROUND OF THE INVENTION

1. Field of the Invention

This invention relates to an anamorphic optical system having a plastic lens, and in particular relates to an anamorphic optical system of which the focal point suffers little displacement due to temperature changes.

2. Description of the Prior Art

Conventionally, the fθ lens used in laser printers is generally an anamorphic lens system comprising two glass lenses. Glass anamorphic lenses are however costly as they must be ground to specifications.

Plastic lenses have thus been proposed to lower manufacturing costs as they do not require grinding.

Plastic lenses show a greater variation of refractive index and linear expansion due to temperature changes, however, and their imaging performance is easily impaired due to displacement of the focal point. In devices such as laser printers where no provision is made for focusing, therefore, it has been difficult to employ plastic lenses.

SUMMARY OF THE INVENTION

In view of the aforesaid problems, it is an object of the invention to provide an anamorphic optical system which is not substantially affected by temperature changes although plastic lenses are used.

To achieve the above object, the invention is characterized in that the system includes an imaging lens group comprising one or more plastic lenses and a correcting lens group comprising one or more plastic lenses such that the focal displacement of the system is kept within the focal depth.

DETAILED DESCRIPTION OF THE EMBODIMENTS

Figure 1:
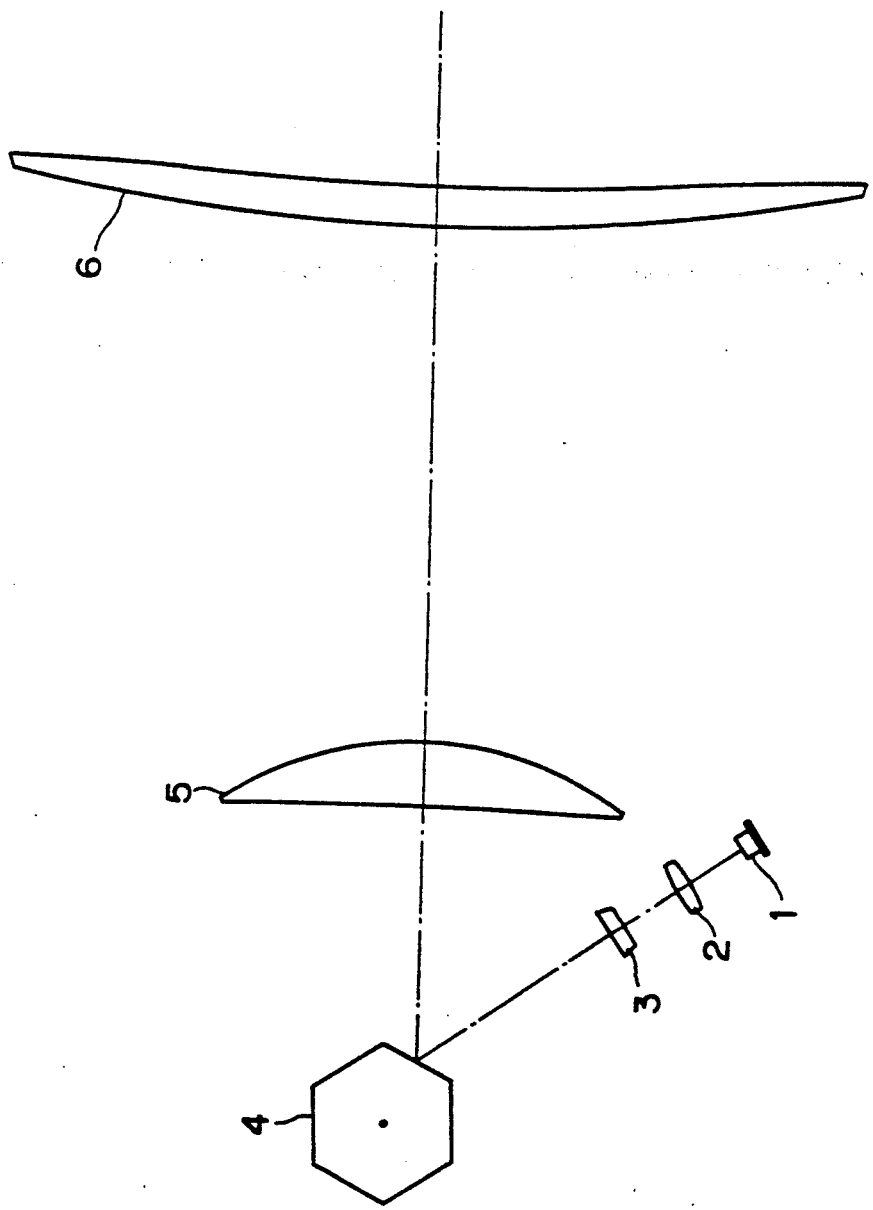
FIG. 1 is a plan view of the optical system in Embodiment 1.

The embodiment of the present invention will now be described hereinafter with reference to the drawings. The present disclosure relates to subject matter contained in Japanese patent application No. H3-123234 (filed on Mar. 5, 1991) which is expressly incorporated herein by reference in its entirety.

First, a focal displacement due to temperature changes will be described.

The focal displacement $\Delta f$ due to temperature changes in an imaging optical system may be considered as the sum of a displacement $\Delta f_n =$ due to change of refractive index and a displacement $f_L$ due to linear expansion. Considering a specific lens in the optical system (having a focal distance f, refractive index n), the focal displacements $\Delta f_n$ and $\Delta f_L$ with respect to a temperature change $\Delta t$ from a reference temperature may be expressed as follows:

$$\Delta f_n = (f/(1-n))\cdot(dn/dt)\cdot\Delta t$$

$$\Delta f_L = f\cdot(1/L)\cdot(dL/dt)\cdot\Delta t$$

where: (dn/dt) is rate of variation of refractive index of lens, (1/L)·(dL/dt) is linear expansion coefficient of lens.

The focal displacements $\Delta f_n$, $\Delta f_L$ generated in any lens in the lens system are either magnified or reduced by the other lenses in the system on the image side. If we represent the magnification of the lenses from and including the aforesaid lens up to the image plane as m, and the magnification of the lenses on the image side of the aforesaid lens as m', the focal displacement $\Delta \epsilon$ which finally appears on the image side may be approximated by the following relation:

$$\Delta\epsilon = (m'-m)^2\cdot(\Delta f_L + \Delta f_n)$$

Considering the whole of the optical system comprising a plurality of lenses, the focal displacement produced by the temperature change is the sum of the focal displacements of all the lenses, and it may be expressed by the following relation:

$$\Delta f_s = (\Sigma K_1 \cdot T_1)\times\Delta t$$

$$K_1 = (m_{1+1} - m_1)^2 \cdot f_1$$

$$T_1 = (1/(1-n))\cdot(dn/dt) + (1L)\cdot(dn/dt)$$

T expresses the focal displacement due to variation of refractive index and linear expansion per unit temperature change of a lens, i.e. static factors due to the temperature characteristics of the lens itself, and K expresses dynamic factors due to the position at which the lens is situated in the lens system.

In an anamorphic optical system which has a different magnification in the vertical and horizontal directions, the effect of temperature changes in these directions must be considered separately. The focal displacements $\Delta f_{By}$ in the principal scanning direction and $\Delta f_{Bz}$ in the auxiliary scanning direction of an anamorphic scanning optical system, for example, are given by the following relations:

$$\Delta f_{By} = (\Sigma K_{y1}\times T_1)\times\Delta t$$

$$\Delta f_{Bz} = (\Sigma K_{z1} \times T_1) \times \Delta t$$

The depths of focus $D_y$ and $D_z$ in the principal and auxiliary scanning directions are given by the following relations wherein the wavelength is $\lambda$, and the F numbers of the light beam traveling toward the image plane are $F_y$ and $F_z$:

$$D_y = \lambda \cdot F_y^2$$

$$D_z = \lambda \cdot F_z^2$$

If an anamorphic optical system having a plastic lens is used, therefore, the curvature of field must be kept within the depth of focus, and the focal displacement due to temperature change must also lie within the depth of focus.

The focal displacement due to temperature changes will now be described in further detail. In the following example, a two-lens anamorphic $f\theta$ lens system designed for glass lenses was manufactured using plastic lenses. These lenses were manufactured from an identical plastic material. Writing the magnifications from and including respectively the first and second lenses of the $f\theta$ lens system up to the image plane as $m_{y1}$, $m_{y2}$ in the principal scanning direction and $M_{z1}$, $M_{z2}$ in the auxiliary scanning direction, the focal lengths of the first and second lenses as $f_{z1}$, $f_{z2}$ in the principal scanning direction and $f_{z1}$, $f_{z2}$ in the auxiliary scanning direction are given respectively by the following relations:

$m_{y1} = 0.000x$, $m_{y2} = -0.539x$, $m_{z1} = -2.094x$, $m_{z2} = -3.162x$.

$f_{y1} = -332.708$, $f_{y2} = 124.622$, $f_{z1} = -99.489$, $f_{z2} = 45.494$.

The focal length variation coefficient T with respect to a temperature change of 1° C. of the plastic material of the lens, and the conversion coefficients $K_{y1}$, $K_{y2}$ in the principal scanning direction and $K_{z1}$, $K_{z2}$ in the auxiliary scanning direction due to the positions at which the first and second lenses are situated in the $f\theta$ lens system, are given by the following relations:

$$T = 275.48 \times 10^{-5}$$

$$K_{y1} = 0.539^2 \times (-332.708) = -96.659$$

$$K_{y2} = 1.539^2 \times (124.622) = 295.170$$

$$K_{z1} = 1.068^2 \times (-99.489) = -113.480$$

$$K_{z2} = 4.162^2 \times (45.494) = 788.058$$

The focal displacements per unit temperature change in the principal scanning direction and auxiliary scanning direction are therefore given respectively by the following relations:

$$\Delta f_{By}/\Delta t = (K_{y1} + K_{y2}) \times T = 0.0547 \text{ mm/}° \text{C.}$$

$$\Delta f_{Bz}/\Delta t = (K_{z1} + K_{z2}) \times T = 0.1858 \text{ mm/}°\text{C.}$$

If the F number is 1:70, the depth of focus is approximately 3.8 mm, and if the temperature range in which the lens is used is ±20° C., the focal displacement in the auxiliary scanning direction is substantially equivalent to the focal depth. In cases wherein there are also curvature of field or manufacturing errors, therefore, the image plane will lie outside the depth of focus.

Embodiment 1

FIG. 1 shows a first embodiment of the anamorphic optical system of this invention. In this optical system, a laser beam from a semiconductor laser 1 is rendered parallel by a collimator lens 2, and is made to converge in the auxiliary scanning direction by a cylindrical lens 3 to a line spread function image at a point L from a polygon mirror 4 which acts as a scanning deflector. The resulting converged beam is then deflected by the polygon mirror 4, and made to form a spot on an image plane, not shown, by an imaging lens 5 and correcting lens 6.

In this embodiment, a scanning lens group having $f\theta$ characteristics comprises a single plastic imaging lens 5 (first lens) and a single plastic correcting lens 6 (second lens).

In this type of scanning optical system, to reduce the focal displacement due to temperature changes, it is desirable to distribute the power of the $f\theta$ lens on the image plane side and reduce the magnification. In the anamorphic optical system of this embodiment, therefore, the power in the auxiliary scanning direction is distributed more towards the image plane by providing a correcting lens disposed on the image plane side of the imaging lens. More specifically, it is desirable that: $|m_z| < 1.2$ The magnification $m_z$ of the respective lenses is also limited by arranging that all the lenses have a positive power in the auxiliary scanning direction.

Table 1 shows typical numerical examples of the parameters of this optical system. In the Table, $f_{CL}$ is the focal length of the cylindrical lens, L is the distance between the polygon mirror and the line spread function image, and $A_y$, $A_z$ are the slit widths of the light beam with respect to the auxiliary and principal scanning directions after it has passed through the collimator lens.

A reference f is the focal length in the principal scanning direction of the $f\theta$ lens system, $F_y$ is the F number in the principal scanning direction of the light beam which has passed through the $f\theta$ lens system, $F_z$ is the F number of same in the auxiliary scanning direction, Lep is the distance from the polygon mirror to the first surface of the $f\theta$ lens system, $r_y$, $r_z$ are the radii of curvature of the $f\theta$ lens system in respectively the principal and auxiliary scanning directions, d is the lens thickness or air gap, and n is the refractive index of the lens at wavelength 780 nm.

In the explanation of the Table, the figures in the column for radii of curvature of aspherical surfaces are the radii of curvature at the apices of the aspherical surfaces.

The aspherical surfaces are expressed as follows:

$$X = \frac{CY^2}{1 + \sqrt{1 - (1 + K)C^2 Y^2}} + A_4 Y^4 + A_6 Y^6 + A_8 Y^8 + A_{10} Y^{10}$$

wherein X is a distance from a tangential plane of the vertex of an aspherical surface on the aspherical surface where the height Y from the optical axis, C is the curvature (1/r) of the vertex of the aspherical surface, K is the coefficient of a circular cone, and the $A_4$, $A_6$, $A_8$ and $A_{10}$ are aspherical surface coefficients. These coefficients are as shown in Table 1.

Figure 2:
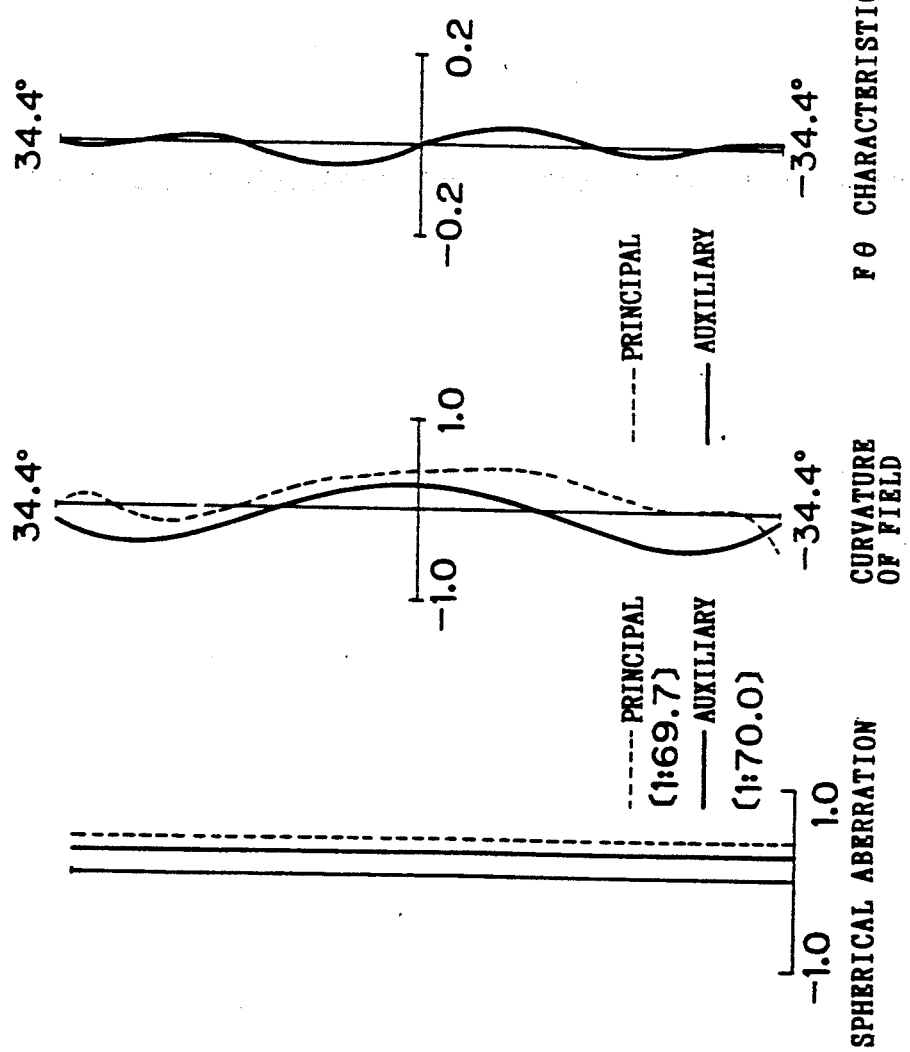
FIG. 2 is a drawing of optical aberrations produced by the fθ lens system of Embodiment 1.

FIG. 2 shows optical aberrations produced by the $f\theta$ lens system in the construction of Table 1. In the table, d4 shows distance from fourth surface to image surface.

In these embodiments, in order to optimize the curvature of field characteristics of the fθ lens, the image plane is displaced from the focal point. The spherical aberrations in the figure are values on this displaced image plane.

TABLE 1

$f_{CL} = 50.1$  $L = -10.44$  $A_y = 2.58$  $A_z = 0.24$
$f = 179.78$  $F_y = 69.7$  $F_z = 70.0$
$Lep = 64.37$

| Surface Number | $r_y$ | $r_z$ | d | n |
|---|---|---|---|---|
| 1 | −1389.664 | | 15.96 | 1.48479 |
| 2 | −83.309 | | 130.00 | |
| 3 | 478.738 | 20.719 | 10.22 | 1.48479 |
| 4 | 542.524 | | 44.50 | |

| Aspherical surface coefficients | |
|---|---|
| Second surface | Fourth surface |
| K = −0.32814 | K = −8.08814 |
| $A_4$ = 6.80793 × 10$^{-9}$ | $A_4$ = −2.15920 × 10$^{-6}$ |
| $A_6$ = 0 | $A_6$ = −4.09928 × 10$^{-12}$ |
| $A_8$ = 0 | $A_8$ = 3.47727 × 10$^{-16}$ |
| $A_{10}$ = 0 | $A_{10}$ = −1.07267 × 10$^{-20}$ |

Table 2 gives the focal lengths, magnifications and focal displacements due to temperature changes of each of the aforesaid lenses and of the whole fθ lens system. In the Table, $f_y$, $f_z$ are the focal lengths in the principal and auxiliary scanning directions, and $m_y$, $m_z$ are the magnifications in the principal and auxiliary scanning directions.

$K_y$, $K_z$ are conversion coefficients in respectively the principal and auxiliary scanning directions due to the position at which a lens is situated in the lens system, and T·$K_y$, T·$K_z$ are focal displacements in respectively the principal and auxiliary scanning directions due to variation of refractive index and linear expansion per unit temperature change. In practice, it is desirable that T·$K_y$, T·$K_z$ are equal to λF/30.

TABLE 2

| | First lens | Second lens | Whole system |
|---|---|---|---|
| $f_y$ | 182.078 | 7981.649 | |
| $f_z$ | 182.078 | 44.152 | |
| $m_y$ | 0.000x | 0.987x | |
| $m_z$ | −0.336x | −0.175x | |
| $K_y$ | 177.375 | 1.349 | |
| $K_z$ | 4.720 | 60.957 | |
| T·$K_y$ | 0.049 | 0.000 | 0.049 |
| T·$K_z$ | 0.001 | 0.017 | 0.018 |

Embodiment 2

Figure 3:
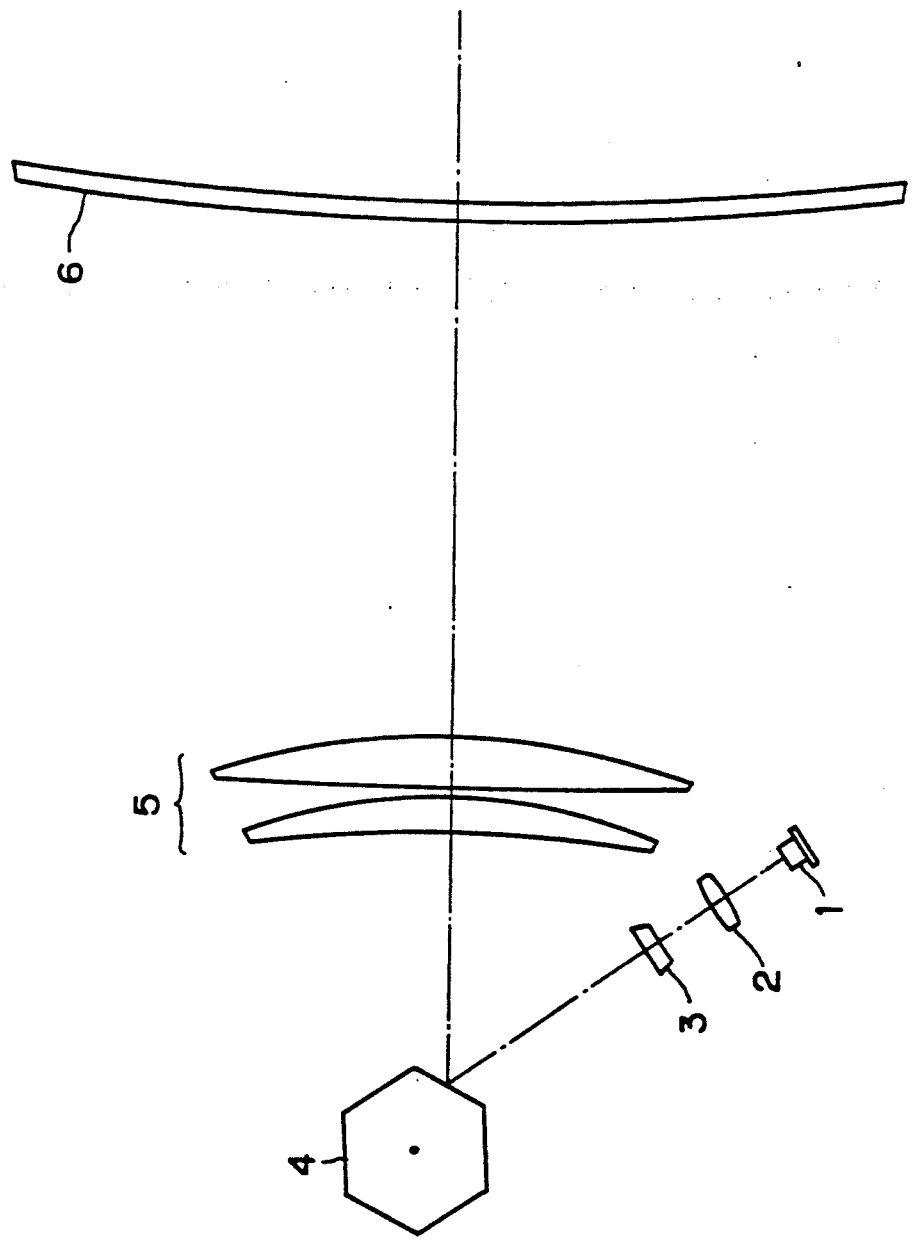
FIG. 3 is a plan view of the optical system in Embodiment 2.
Figure 4:
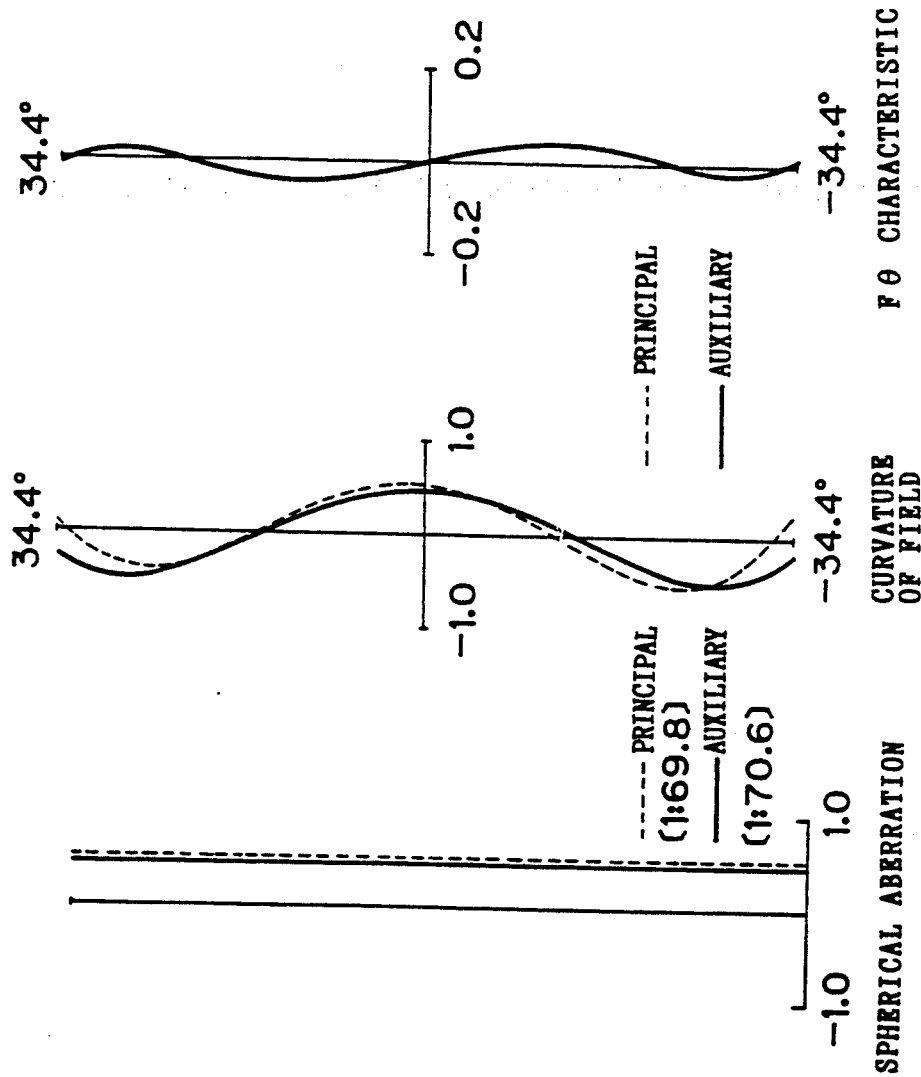
FIG. 4 is a drawing of optical aberrations produced by the fθ lens system of Embodiment 2.

FIG. 3 shows a second embodiment of this invention. In embodiments 2–7, the fθ lens system comprises two imaging lenses 5 (first and second lens), and a single correcting lens 6 (third lens). In particular, in Embodiments 2–5 and 7, the imaging lens group comprises two positive lenses, so the difference in thickness between the center and the edge of the lens can be kept small. This is an advantageous configuration insofar as regards the inherent sink and distortion of molded plastic lenses. Tables 3 and 4 give specific numerical examples, and FIG. 4 shows optical aberrations produced by the system. In the table 3, d6 shows distance from sixth surface to the image surface.

TABLE 3

$f_{CL} = 50.01$  $L = -10.44$  $A_y = 2.58$  $A_z = 0.23$
$f = 180.01$  $F_y = 69.8$  $F_z = 70.6$
$Lep = 61.21$

| Surface Number | $r_y$ | $r_z$ | d | n |
|---|---|---|---|---|
| 1 | −364.477 | | 9.28 | 1.48479 |
| 2 | −128.234 | | 2.00 | |
| 3 | 1341.631 | | 12.25 | 1.48479 |
| 4 | 0176.937 | | 126.81 | |
| 5 | 704.054 | 20.222 | 5.00 | 1.48479 |
| 6 | 758.086 | | 46.16 | |

TABLE 4

| | First lens | Second lens | Third lens | Whole system |
|---|---|---|---|---|
| $f_y$ | 402.926 | 326.312 | | |
| $f_z$ | 402.926 | 325.312 | 42.761 | |
| $m_y$ | 0.000x | 0.447x | 0.995x | |
| $m_z$ | −0.325x | −0.258x | −0.171x | |
| $K_y$ | 80.508 | 97.692 | | |
| $K_z$ | 1.809 | 2.462 | 58.636 | |
| T·$K_y$ | 0.022 | 0.027 | | 0.047 |
| T·$K_z$ | 0.000 | 0.001 | 0.016 | 0.017 |

Embodiment 3

Figure 5:
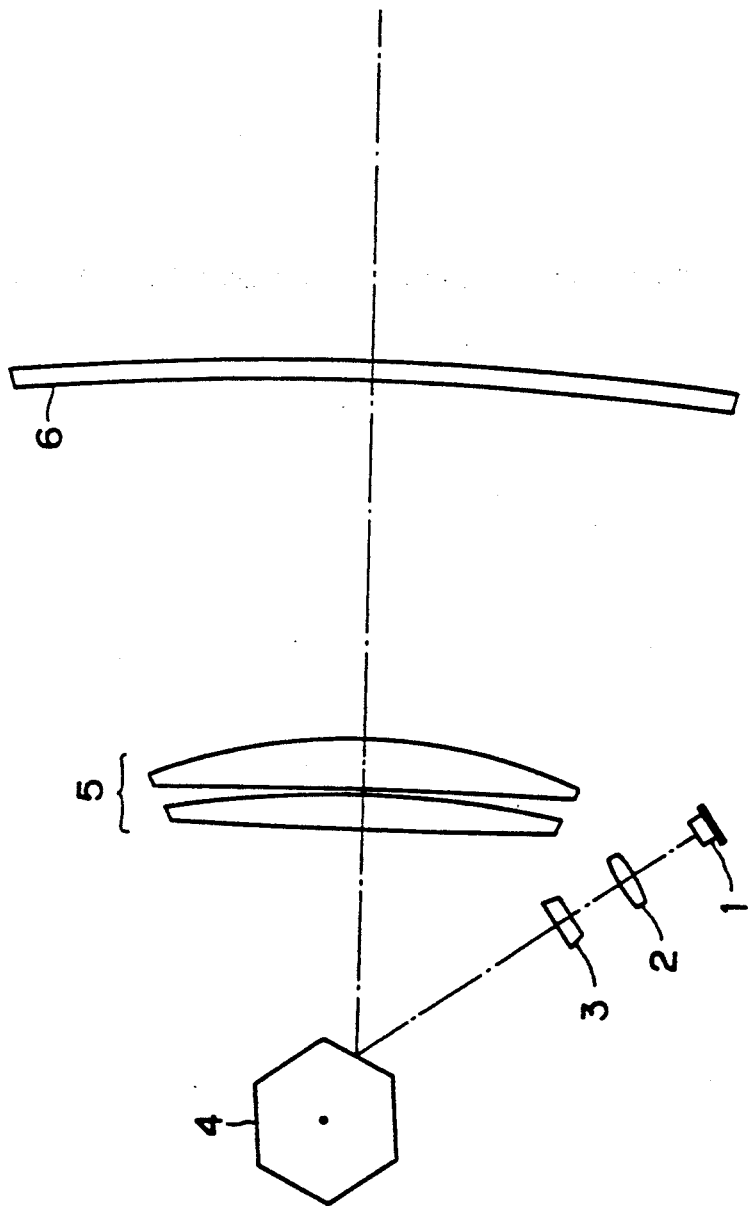
FIG. 5 is a plan view of the optical system in Embodiment 3.
Figure 6:
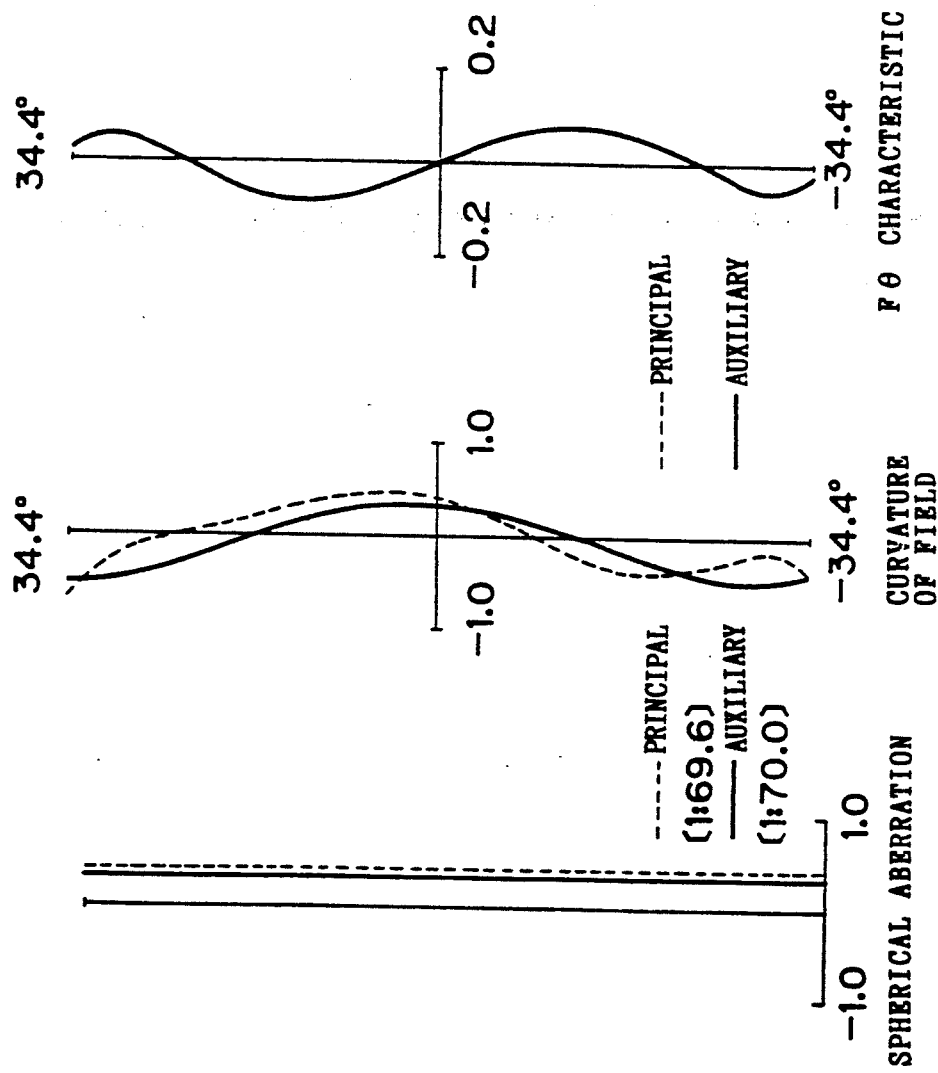
FIG. 6 is a drawing of optical aberrations produced by the fθ lens system of Embodiment 3.

FIG. 5 shows a third embodiment of this invention. Table 5 and 6 give specific numerical examples, and FIG. 6 shows optical aberrations produced by the system.

As described hereintofore, the power of the fθ lens in the optical system of each embodiment is distributed more towards the image plane. If the power of the fθ lens is merely distributed on the image plane side, however, the distance from the convergence point of the light beam to the principal point of the fθ lens increases, and less light is collected by the fθ lens from the light source.

In the following embodiments, therefore, a cylindrical lens 3 of longer focal length than in Embodiments 1 and 2 is used so that the power of the lens 3 is reduced and the slit width $A_z$ is increased. As a result, not only is the the focal displacement due to temperature changes kept within predetermined tolerance limits and not only are energy losses limited, but also more light can be collected by the fθ lens system.

If the slit width $A_z$ is small, the wavefront is disturbed by diffraction and imaging performance declines. In Embodiment 3 therefore, in order to limit energy losses and disturbance of the wavefront due to diffraction, the power of the cylindrical lens is reduced, the magnification in the auxiliary scanning direction is made more negative by disposing the correcting lens nearer the imaging lens than in the other embodiments, and $A_z$ is increased. It is moreover desirable that the magnification satisfies the following condition:

$$f_{CL} \times (|m_z|/F_z) > 0.7$$

TABLE 5

$f_{CL} = 78.32$  $L = 17.87$  $A_y = 2.58$  $A_z = 0.86$
$f = 179.68$  $F_y = 69.6$  $F_z = 70.0$
$Lep = 55.00$

| Surface Number | $r_y$ | $r_z$ | d | n |
|---|---|---|---|---|
| 1 | 1000.000 | | 8.35 | 1.48479 |
| 2 | −266.384 | | 2.00 | |

TABLE 5-continued $f_{CL} = 78.32$   $L = 17.87$   $A_y = 2.58$   $A_z = 0.86$
$f = 179.68$   $F_y = 69.6$   $F_z = 70.0$
$Lep = 55.00$

| | | | | |
|---|---|---|---|---|
| 3 | −1000.000 | | 12.53 | 1.48479 |
| 4 | −128.660 | | 86.68 | |
| 3 | −744.000 | 28.850 | 5.00 | 1.48479 |
| 4 | −704.000 | | 85.44 | |

Aspherical surface coefficients
First surface

$K = 0.43694$
$A_4 = -1.02285 \times 10^{-7}$
$A_6 = 1.53885 \times 10^{-11}$
$A_8 = -1.22494 \times 10^{-15}$
$A_{10} = 0$

TABLE 6

| | First lens | Second lens | Third lens | Whole system |
|---|---|---|---|---|
| $f_y$ | 434.835 | 297.764 | | |
| $f_z$ | 434.835 | 297.764 | 52.413 | |
| $m_y$ | 0.000x | 0.413x | 0.999x | |
| $m_z$ | −0.836x | −0.792x | −0.693x | |
| $K_y$ | 74.169 | 102.251 | | |
| $K_z$ | 0.842 | 2.918 | 150.229 | |
| $T \cdot K_y$ | 0.020 | 0.028 | | 0.048 |
| $T \cdot K_z$ | 0.000 | 0.001 | 0.041 | 0.042 |

Embodiment 4

Figure 7:
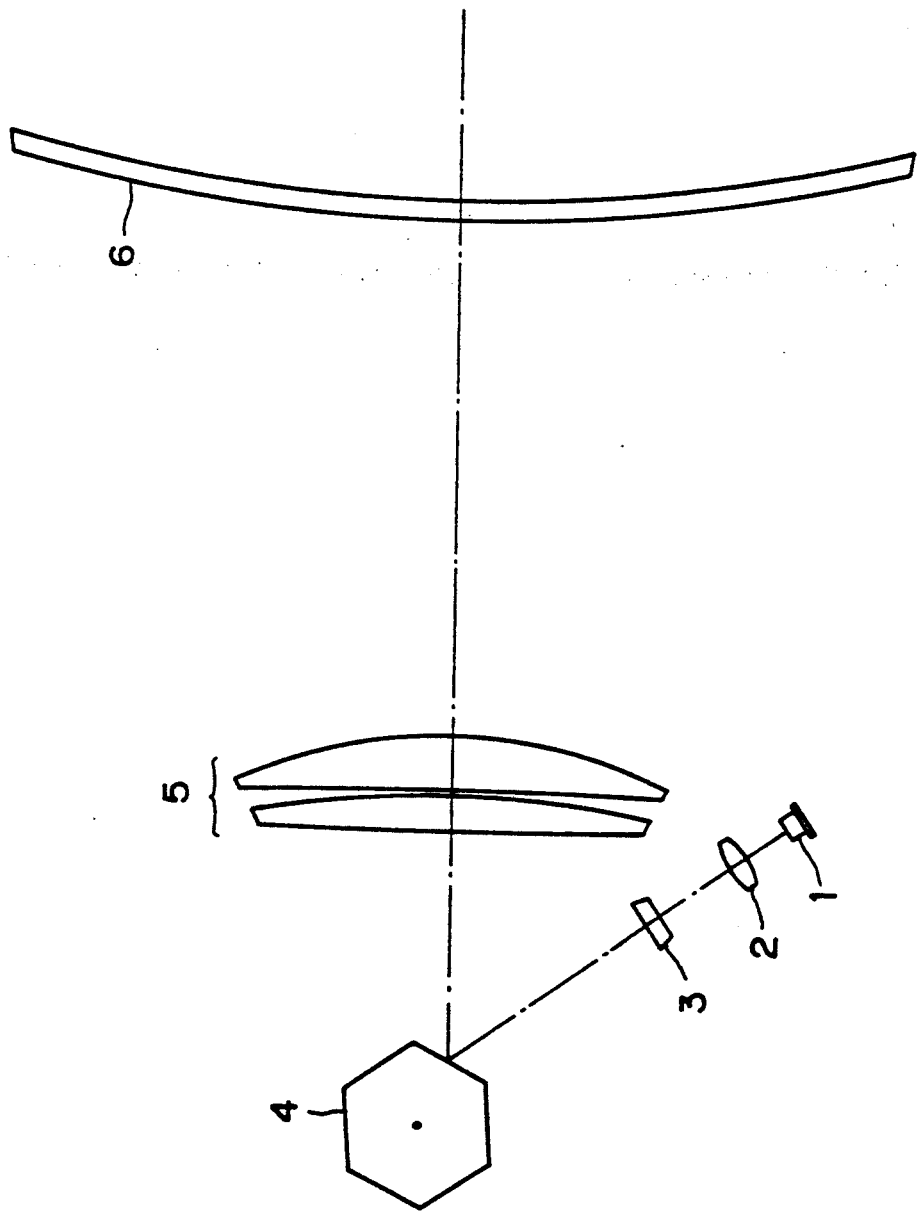
FIG. 7 is a plan view of the optical system in Embodiment 4.
Figure 8:
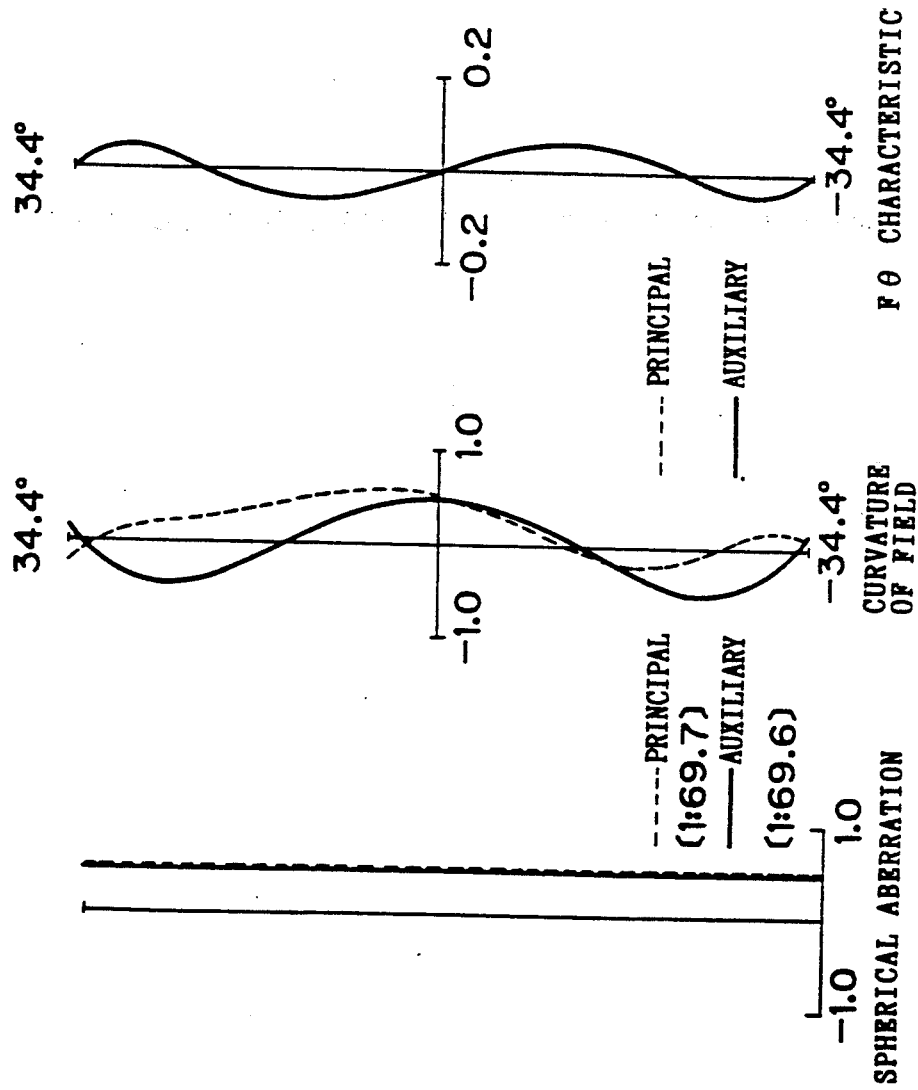
FIG. 8 is a drawing of optical aberrations produced by the fθ lens system of Embodiment 4.

FIG. 7 shows a fourth embodiment of this invention. Tables 7 and 8 give specific numerical examples, and FIG. 8 shows optical aberrations produced by the system.

TABLE 7

$f_{CL} = 78.32$   $L = 17.87$   $A_y = 2.58$   $A_z = 0.92$
$f = 179.87$   $F_y = 69.6$   $F_z = 69.6$
$Lep = 55.00$

| Surface Number | $r_y$ | $r_z$ | d | n |
|---|---|---|---|---|
| 1 | 1000.000 | | 8.35 | 1.48479 |
| 2 | −266.384 | | 2.00 | |
| 3 | −1000.000 | | 12.48 | 1.48479 |
| 4 | −127.330 | −29.800 | 126.66 | |
| 5 | 413.302 | 21.800 | 5.00 | 1.48479 |
| 6 | 408.760 | | 45.51 | |

Aspherical surface coefficients
First surface

$K = 0.43594$
$A_4 = -1.02285 \times 10^{-7}$
$A_6 = 1.53885 \times 10^{-11}$
$A_8 = -1.22494 \times 10^{-15}$

TABLE 8

| | First lens | Second lens | Third lens | Whole system |
|---|---|---|---|---|
| $f_y$ | 434.835 | 299.573 | | |
| $f_z$ | 434.835 | 63.092 | 47.301 | |
| $m_y$ | 0.000x | 0.414x | 0.996x | |
| $m_z$ | −0.818x | −0.738x | −0.047x | |
| $K_y$ | 74.529 | 101.473 | | |
| $K_z$ | 2.783 | 30.125 | 51.852 | |
| $T \cdot K_y$ | 0.021 | 0.028 | | 0.049 |
| $T \cdot K_z$ | 0.001 | 0.008 | 0.014 | 0.023 |

Embodiment 5

Figure 9:
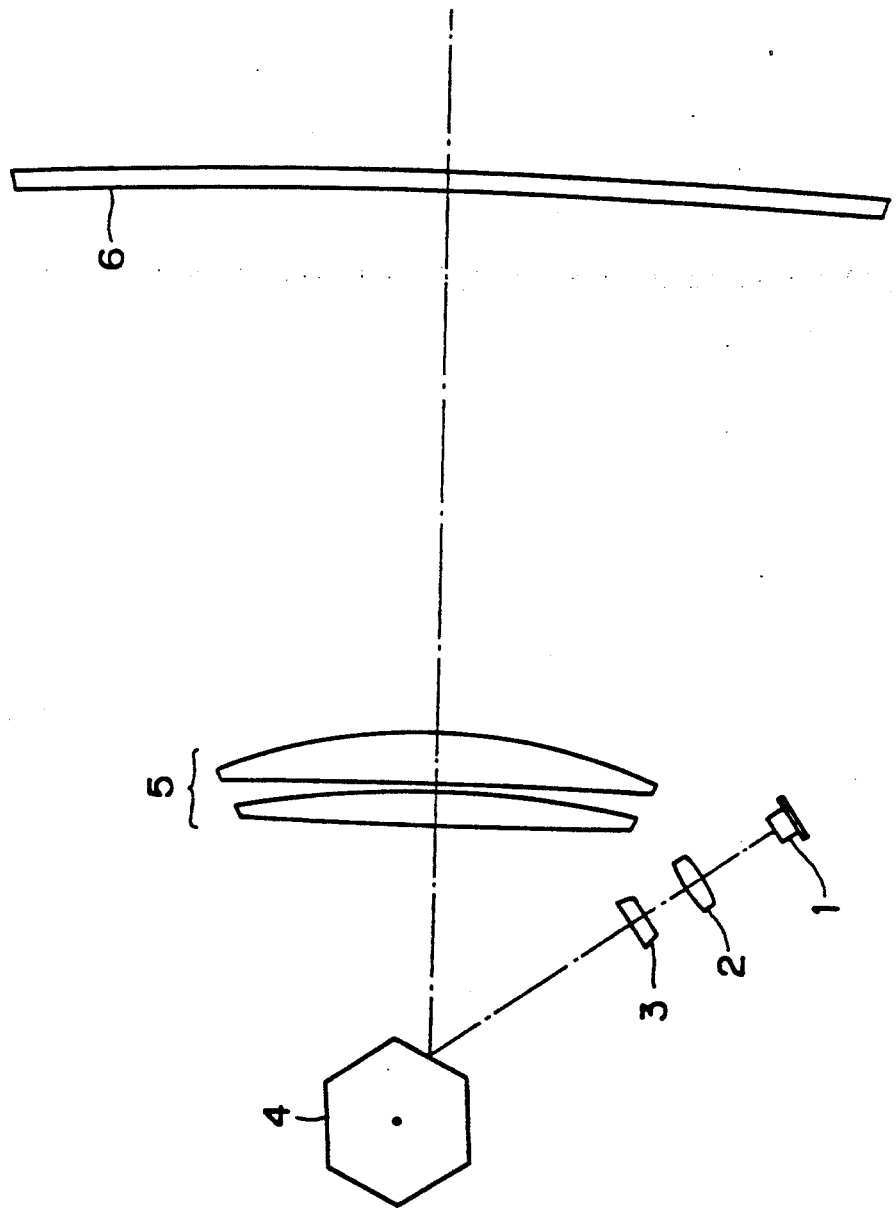
FIG. 9 is a plan view of the optical system in Embodiment 5.
Figure 10:
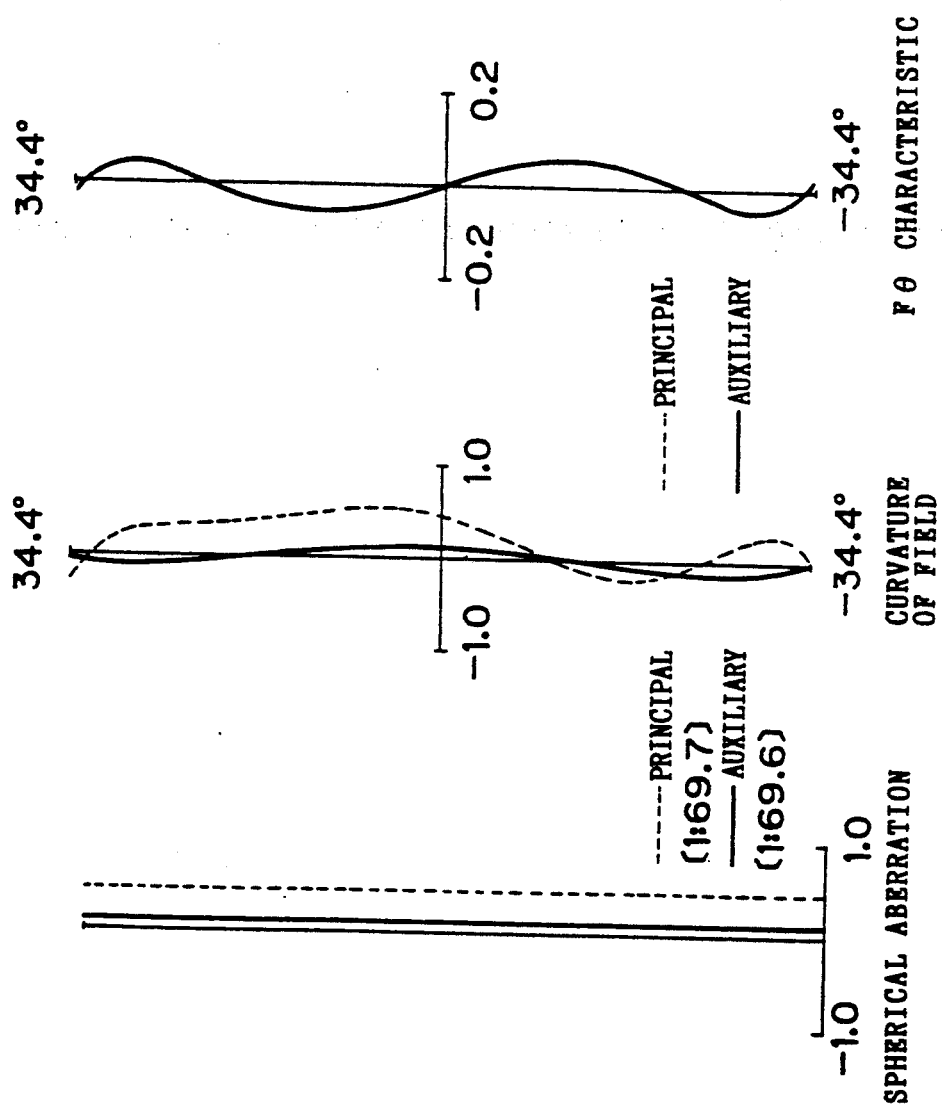
FIG. 10 is a drawing of optical aberrations produced by the fθ lens system of Embodiment 5.

FIG. 9 shows a fifth embodiment of this invention. Tables 9 and 10 give specific numerical examples, and FIG. 10 shows optical aberrations produced by the system.

TABLE 9

$f_{CL} = 146.85$   $L = 86.40$   $A_y = 2.58$   $A_z = 0.68$
$f = 179.85$   $F_y = 69.7$   $F_z = 69.7$
$Lep = 55.55$

| Surface Number | $r_y$ | $r_z$ | d | n |
|---|---|---|---|---|
| 1 | 1000.000 | | 8.15 | 1.48479 |
| 2 | −263.618 | | 2.17 | |
| 3 | −1430.844 | | 12.60 | 1.48479 |
| 4 | −132.000 | | 132.29 | |
| 5 | −1774.426 | 15.400 | 5.00 | 1.48479 |
| 6 | −1774.426 | | 39.24 | |

Aspherical surface coefficients
First surface

$K = 0.32543$
$A_4 = -1.03486 \times 10^{-7}$
$A_6 = 1.53108 \times 10^{-11}$
$A_8 = -1.09097 \times 10^{-15}$
$A_{10} = 0$

TABLE 10

| | First lens | Second lens | Third lens | Whole system |
|---|---|---|---|---|
| $f_y$ | 431.242 | 299.007 | | |
| $f_z$ | 431.242 | 299.007 | 31.521 | |
| $m_y$ | 0.00x | 0.471x | 1.001x | |
| $m_z$ | −0.322x | −0.341x | −0.354x | |
| $K_y$ | 74.988 | 101.978 | | |
| $K_z$ | 0.156 | 0.051 | 57.788 | |
| $T \cdot K_y$ | 0.021 | 0.028 | | 0.049 |
| $T \cdot K_z$ | 0.000 | 0.000 | 0.016 | 0.016 |

Embodiment 6

Figure 11:
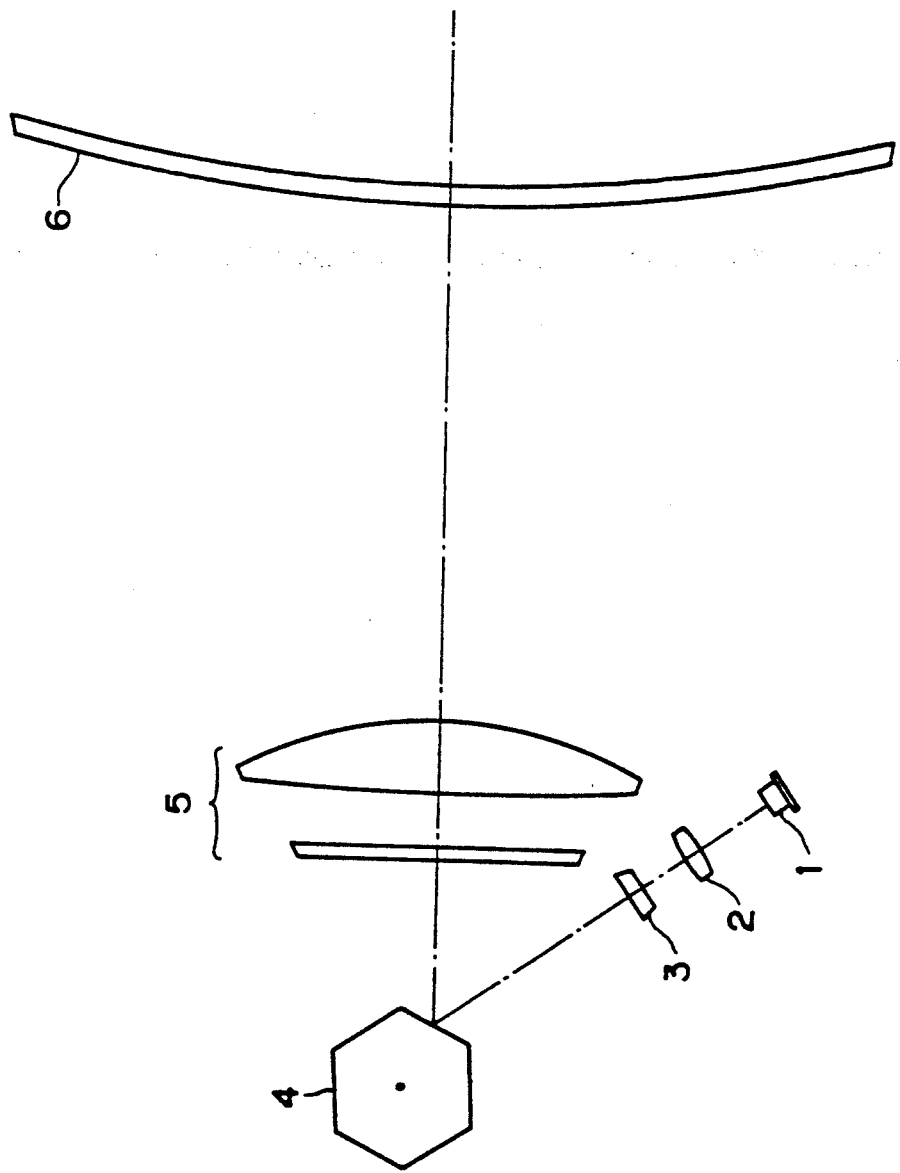
FIG. 11 is a plan view of the optical system in Embodiment 6.
Figure 12:
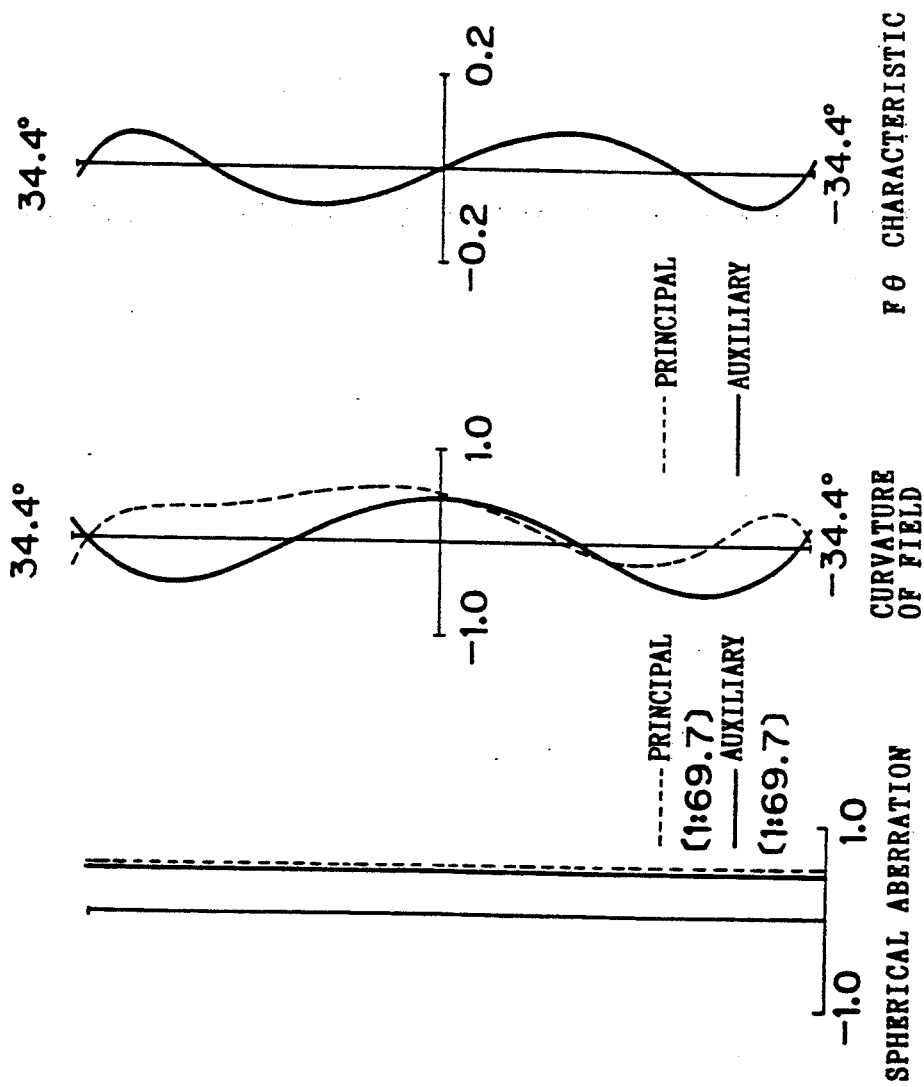
FIG. 12 is a drawing of optical aberrations produced by the fθ lens system of Embodiment 6.

FIG. 11 shows a sixth embodiment of this invention. Tables 11 and 12 give specific numerical examples, and FIG. 12 shows optical aberrations produced by the system.

TABLE 11

$f_{CL} = 97.90$   $L = 37.45$   $A_y = 2.58$   $A_z = 1.15$
$f = 179.73$   $F_y = 69.7$   $F_z = 69.7$
$Lep = 40.76$

| Surface Number | $r_y$ | $r_z$ | d | n |
|---|---|---|---|---|
| 1 | ∞ | | 3.50 | 1.48479 |
| 2 | ∞ | | 13.21 | |
| 3 | 588.744 | | 18.47 | 1.48479 |
| 4 | −101.626 | −19.992 | 130.20 | |
| 5 | 424.512 | 19.121 | 5.00 | 1.48479 |
| 6 | 419.408 | | 44.05 | |

Aspherical surface coefficients
First surface

$K = 0.43703$
$A_4 = -2.27825 \times 10^{-7}$
$A_6 = 2.90754 \times 10^{-11}$
$A_8 = -2.11309 \times 10^{-15}$
$A_{10} = 0$

TABLE 12

| | First lens | Second lens | Third lens | Whole system |
|---|---|---|---|---|
| $f_y$ | | 180.345 | | |
| $f_z$ | | 40.283 | 41.158 | |
| $m_y$ | 0.000x | 0.000x | 0.997x | |

TABLE 12-continued

|  | First lens | Second lens | Third lens | Whole system |
|---|---|---|---|---|
| $m_z$ | −0.818x | −0.818 | −0.167x |  |
| $K_y$ |  | 179.265 |  |  |
| $K_z$ |  | 17.072 | 56.053 |  |
| $T \cdot K_y$ |  | 0.049 |  | 0.049 |
| $T \cdot K_z$ |  | 0.005 | 0.015 | 0.020 |

Embodiment 7

Figure 13:
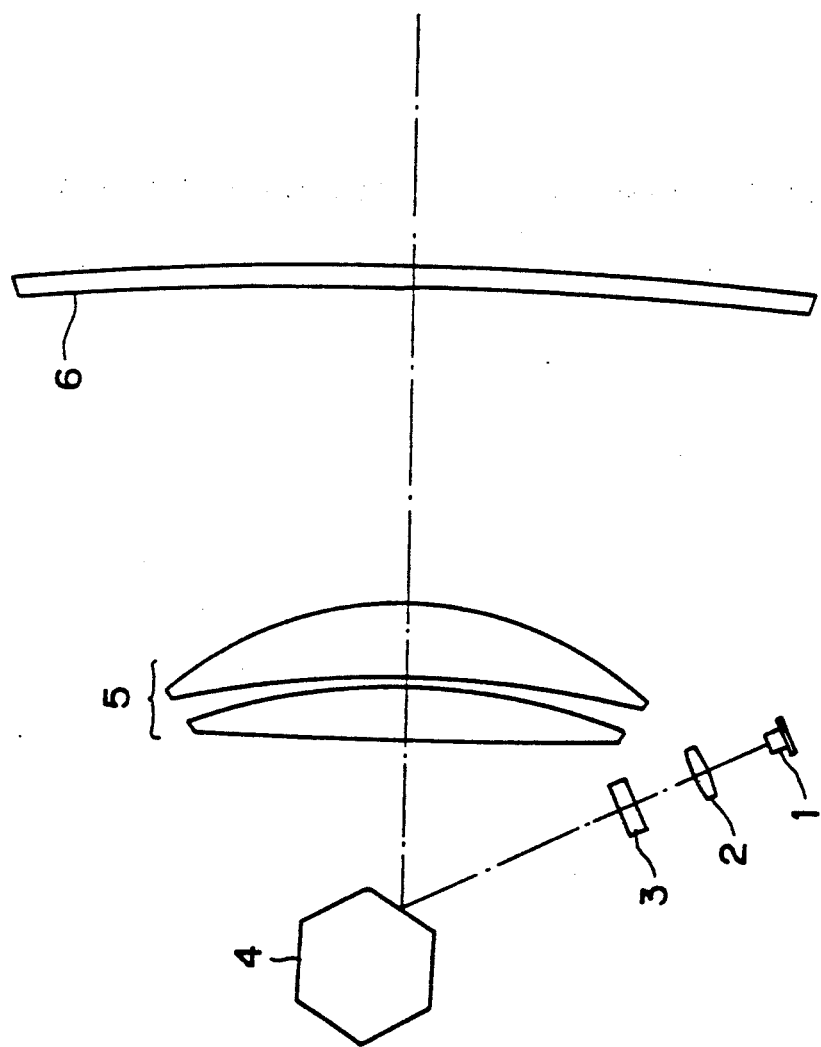
FIG. 13 is a plan view of the optical system in Embodiment 7.
Figure 14:
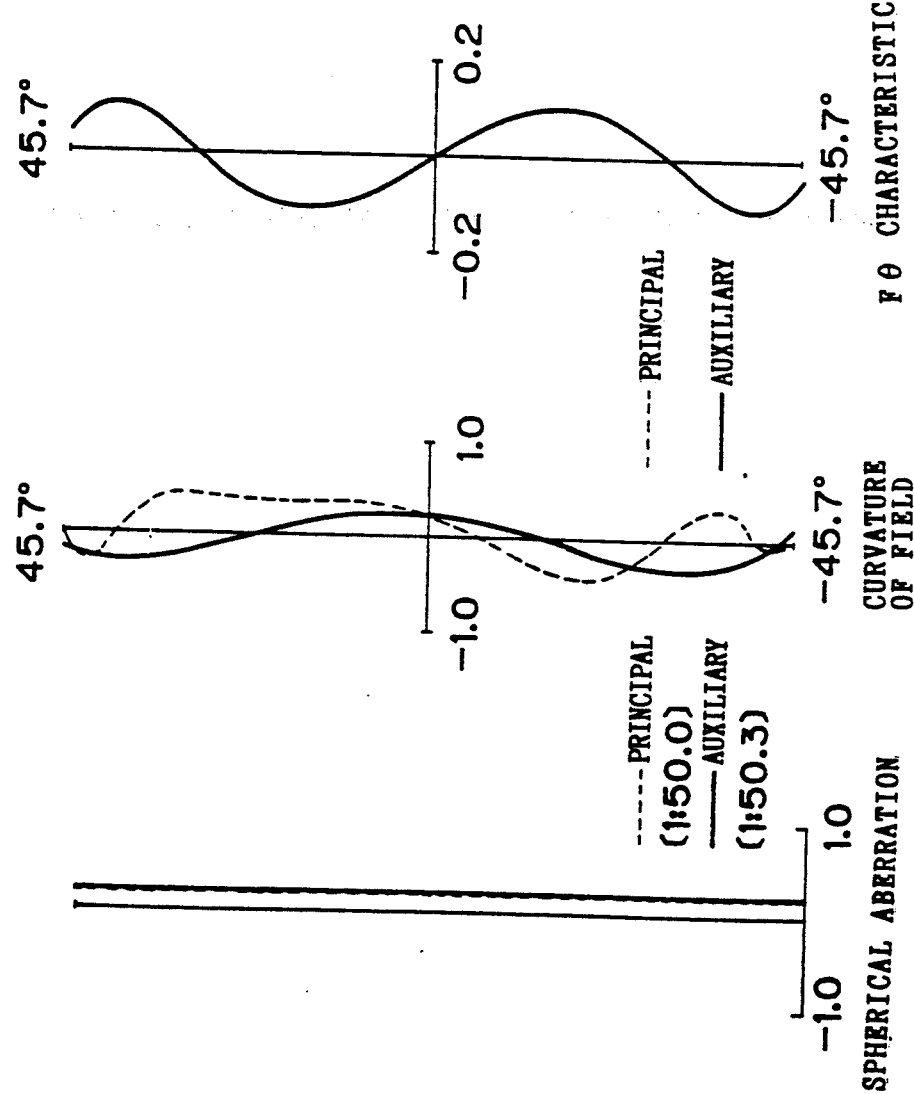
FIG. 14 is a drawing of optical aberrations produced by the f θ lens system of Embodiment 7.

FIG. 13 shows a seventh embodiment of this invention. Tables 13 and 14 give specific numerical examples, and FIG. 14 shows optical aberrations produced by the system.

In this embodiment, the focal length is shorter than in the other embodiments and the radius of curvature is small, so the imaging lens group comprises two lenses which share the power. Using plastic of low refractive index for short focal lengths, if the imaging group comprised only one lens, the radius of curvature would be too small and the thickness from the center to the edge of the lens would be too large, which would easily lead to sink and distortion when the lens was molded.

TABLE 13

$f_{CL} = 78.32$  L = 21.87  $A_y = 2.70$  $A_z = 0.84$
f = 185.03  $F_y = 50.0$  $F_z = 50.3$
Lep = 40.40

| Surface Number | $r_y$ | $r_z$ | d | n |
|---|---|---|---|---|
| 1 | 850.000 |  | 13.00 | 1.48479 |
| 2 | −146.741 |  | 2.00 |  |
| 3 | −260.246 |  | 18.00 | 1.48479 |
| 4 | −86.452 |  | 76.63 |  |
| 5 | −962.549 | 19.220 | 5.00 | 1.48479 |
| 6 | −961.030 |  | 49.68 |  |

Aspherical surface coefficients
First surface

K = −3.36930
$A_4$ = −2.46288 × $10^{-7}$
$A_6$ = 4.86578 × $10^{-11}$
$A_8$ = −6.02851 × $10^{-15}$
$A_{10}$ = 0

TABLE 14

|  | First lens | Second lens | Third lens | Whole system |
|---|---|---|---|---|
| $f_y$ | 259.232 | 258.302 |  |  |
| $f_z$ | 259.232 | 258.302 | 38.934 |  |

TABLE 14-continued

|  | First lens | Second lens | Third lens | Whole system |
|---|---|---|---|---|
| $m_y$ | 0.000x | 0.520x | 1.002x |  |
| $m_z$ | −0.539x | −0.472x | −0.367x |  |
| $K_y$ | 70.096 | 60.010 |  |  |
| $K_z$ | 1.164 | 2.848 | 72.756 |  |
| $T \cdot K_y$ | 0.019 | 0.017 |  | 0.036 |
| $T \cdot K_z$ | 0.000 | 0.001 | 0.020 | 0.021 |

What is claimed is:

1. An anamorphic optical system having a focal depth, said optical system further comprising a plurality of plastic lenses, each said lens having a positive focal length in a predetermined direction, wherein the focal displacement of said system due to temperature changes is kept within said focal depth of the optical system.

2. The anamorphic optical system according to claim 1, wherein said predetermined direction is an auxiliary scanning direction.

3. An anamorphic optical system having a focal depth, said optical system further comprising:
an imaging lens group comprising one or more plastic lenses; and
a single plastic correcting lens;
wherein the focal displacement of said system due to temperature changes lies within said focal depth of said system.

4. The anamorphic optical system according to claim 3, wherein said imaging lens group and said correcting lens constitute a scanning lens group with fθ characteristics.

5. An anamorphic optical system comprising:
a collimator lens which renders parallel light beams emitted by a light source;
a cylindrical lens which converges said parallel light beams in an auxiliary scanning direction so as to form a line spread function image;
a scanning deflector which deflects the light beam that has passed through said cylindrical lens in a principal scanning direction;
a scanning lens group comprising an imaging lens group of one or more plastic lenses and a single plastic correcting lens disposed on the image plane side of said imaging lens group; wherein
the focal displacement due to temperature changes lies within a focal depth of the system.

6. The anamorphic optical system according to claim 5, wherein said cylindrical lens forms said line spread function image nearer the image plane than said scanning deflector.

* * * * *

UNITED STATES PATENT AND TRADEMARK OFFICE
CERTIFICATE OF CORRECTION

PATENT NO. : 5,200,850
DATED : April 6, 1993
INVENTOR(S) : T. IIZUKA et al.

It is certified that error appears in the above-indentified patent and that said Letters Patent is hereby corrected as shown below:

On the title page, item (57) in the Abstract, line 4, change "said", to ---side---.

Signed and Sealed this

Ninth Day of August, 1994

Attest:

BRUCE LEHMAN

*Attesting Officer*              *Commissioner of Patents and Trademarks*